US009962856B2

(12) United States Patent
Sterkenburg (10) Patent No.: US 9,962,856 B2
(45) Date of Patent: May 8, 2018

(54) PRESS FOR MAKING A CUTTING TOOL GREEN BODY HAVING A HELICAL FLUTE, AND METHOD FOR MAKING A CUTTING TOOL GREEN BODY HAVING A HELICAL FLUTE

(71) Applicant: SECO TOOLS AB, Fagersta (SE)

(72) Inventor: Dirk Sterkenburg, Gustafs (SE)

(73) Assignee: SECO TOOLS AB, Fagersta (SE)

( * ) Notice: Subject to any disclaimer, the term of this patent is extended or adjusted under 35 U.S.C. 154(b) by 41 days.

(21) Appl. No.: 15/022,617

(22) PCT Filed: Sep. 30, 2014

(86) PCT No.: PCT/EP2014/070985
§ 371 (c)(1),
(2) Date: Mar. 17, 2016

(87) PCT Pub. No.: WO2015/044461
PCT Pub. Date: Apr. 2, 2015

(65) Prior Publication Data
US 2016/0229082 A1    Aug. 11, 2016

(30) Foreign Application Priority Data
Sep. 30, 2013  (EP) .................................. 13186650

(51) Int. Cl.
*B22F 5/06* (2006.01)
*B22F 5/00* (2006.01)
*B28B 3/08* (2006.01)
*B28B 7/10* (2006.01)
*B28B 7/20* (2006.01)
(Continued)

(52) U.S. Cl.
CPC ................ *B28B 3/086* (2013.01); *B22F 3/03* (2013.01); *B22F 5/06* (2013.01); *B28B 7/0064* (2013.01);
(Continued)

(58) Field of Classification Search
None
See application file for complete search history.

(56) References Cited

U.S. PATENT DOCUMENTS 3,677,671 A * 7/1972 Martin ...................... B22F 5/08
425/418
3,694,127 A * 9/1972 Takahashi ................. B22F 5/08
29/893.3
(Continued)

FOREIGN PATENT DOCUMENTS

CN     1575913 A    2/2005
CN     1798623 A    7/2006
(Continued)

*Primary Examiner* — Mary Lynn F Theisen
(74) *Attorney, Agent, or Firm* — Corinne R. Gorski (57) ABSTRACT

A press for making a cutting tool green body having at least one helical flute includes a die having an opening with a helical protrusion and a punch having at least one helical groove having a shape that matches a shape of the helical protrusion. An electrical punch drive system is arranged to simultaneously rotate the punch, relative to a longitudinal axis of the opening in the die, and axially advance the punch into and along a direction of the longitudinal axis of the opening in the die. A method for making a cutting tool green body having at least one helical flute is also disclosed.

13 Claims, 6 Drawing Sheets

(51) Int. Cl.
    *B30B 15/02*     (2006.01)
    *B30B 11/02*     (2006.01)
    *B22F 3/03*     (2006.01)
    *B30B 1/18*     (2006.01)
    *B30B 15/06*     (2006.01)
    *B28B 7/00*     (2006.01)
    *C04B 35/56*     (2006.01)

(52) U.S. Cl.
    CPC .............. *B28B 7/0097* (2013.01); *B28B 7/10* (2013.01); *B30B 1/18* (2013.01); *B30B 1/181* (2013.01); *B30B 15/022* (2013.01); *B30B 15/065* (2013.01); *C04B 35/5626* (2013.01); *B22F 2005/001* (2013.01); *C04B 2235/3847* (2013.01); *C04B 2235/405* (2013.01)

(56) References Cited

U.S. PATENT DOCUMENTS

| | | | | |
|---|---|---|---|---|
| 3,843,287 | A * | 10/1974 | Fowler | B22F 5/08 29/893.3 |
| 3,909,167 | A * | 9/1975 | Signora | B22F 5/08 29/893.3 |
| 5,259,744 | A * | 11/1993 | Take | B22F 5/08 425/352 |
| 5,366,363 | A | 11/1994 | Good et al. | |
| 5,906,837 | A | 5/1999 | Link et al. | |
| 6,004,120 | A | 12/1999 | Matsubara et al. | |
| 6,156,265 | A | 12/2000 | Sugimoto | |
| 6,165,400 | A * | 12/2000 | Hinzmann | B21K 1/30 264/120 |
| 6,440,357 | B1 | 8/2002 | Hinzmann | |
| 9,555,506 | B2 * | 1/2017 | Matsushita | B23P 15/32 |
| 2006/0288820 | A1 | 12/2006 | Mirchandani et al. | |
| 2010/0159051 | A1 | 6/2010 | Gubanich et al. | |
| 2013/0291609 | A1 * | 11/2013 | Furukawa | B30B 1/18 72/21.4 |
| 2014/0360388 | A1 * | 12/2014 | Aoki | B30B 1/181 100/289 |

FOREIGN PATENT DOCUMENTS

| | | |
|---|---|---|
| DE | 1951303 A1 | 4/1971 |
| GB | 1288419 A | 9/1972 |

* cited by examiner

PRESS FOR MAKING A CUTTING TOOL GREEN BODY HAVING A HELICAL FLUTE, AND METHOD FOR MAKING A CUTTING TOOL GREEN BODY HAVING A HELICAL FLUTE

RELATED APPLICATION DATA

This application is a § 371 National Stage Application of PCT International Application No. PCT/EP2014/070985 filed Sep. 30, 2014 claiming priority of EP Application No. 13186650.1, filed Sep. 30, 2013.

BACKGROUND AND SUMMARY

The present invention relates generally to presses, pressing methods, and cutting tool green bodies made from pressing and, more particularly to presses for making cutting tool green bodies having helical flutes, and pressing methods for making cutting tool green bodies having helical flutes.

It is relatively common in the iron powder industry to manufacture helical gears via a pressing operation. U.S. Pat. No. 5,366,363, U.S. Pat. No. 6,004,120, U.S. Pat. No. 6,440,357, U.S. Pat. No. 6,156,265, and U.S. Pat. No. 3,694,127 are examples of presses for manufacturing helical gears. On the other hand, cemented carbide tools for hole-making or milling of the type that has a helical flute, which are typically of much smaller diameter than helical gears, are typically produced either by metal injection molding or non-near net shape production methods like machining or grinding. US 20060288820 A1 discloses a cutting tool green body made by extrusion.

The inventor has discovered that helical pressing can facilitate production of cemented carbide cutting tool green bodies for holemaking or milling of the type that have a helical flute by pressing of certain helical insert geometries. Such a pressing operation can improve production economy for such products when compared to other production methods like injection molding and extrusion.

A problem with helical pressing is that, of the tool members making up the press tool in the press, at least two must be able to rotate to be able to press helical blanks. Many current helical press manufacturers utilize a plurality of hydraulic cylinders and mechanical components to advance, withdraw, and rotate punches relative to a die, resulting in a substantial amount of relatively bulky mechanical and hydraulic equipment.

It is desirable to provide a more compact drive system and to provide a helical press suitable for manufacture of cutting tool green bodies having helical flutes. The inventor has recognized that multi-axial presses, pressing with several punches independently and having electrical drives rather than hydraulic cylinders, may be suitable for helical pressing of cutting tool green bodies, particularly where pressing forces are in a lower range than is typical of the forces used in manufacturing helical gears. These electrical drives, often based on electrical motors, lead screws like ball screws or roller screws, can provide positioning accuracy that is superior to hydraulic cylinders and often better than ±2 µm. This drive system then utilizes the available positioning accuracy in the electrical multi-axial press' electrical drives rather than having to secure for that within its own design.

According to an aspect of the present invention, a press is provided for making a cutting tool green body having at least one helical flute, wherein the press comprises a die having an opening with at least one helical protrusion, a top punch having at least one helical groove having a shape that matches a shape of the helical protrusion, a bottom punch having at least one helical groove having a shape that matches the shape of the helical protrusion, and a first electrical punch drive system arranged to simultaneously rotate, relative to a longitudinal axis of the opening in the die, and axially advance, into a top end and along a direction of the longitudinal axis of the opening in the die, the top punch, the press being further arranged with a second electrical punch drive system arranged to simultaneously rotate, relative to the longitudinal axis of the opening in the die, and axially advance, into a bottom end and along the direction of the longitudinal axis of the opening in the die, the bottom punch.

According to another aspect of the present invention, a method of making a cutting tool green body having at least one helical flute is provided and comprises supplying an opening in a die having at least one helical protrusion for forming the helical flute with a metal carbide powder, and compressing the powder by operating a first electrical punch drive system to simultaneously rotate, relative to a longitudinal axis of the opening in the die, and axially advance, into a top end of the opening and along a direction of the longitudinal axis of the opening in the die, a top punch having at least one helical groove having a shape that matches a shape of the helical protrusion, and operating a second electrical punch drive system to simultaneously rotate, relative to a longitudinal axis of the opening in the die, and axially advance, into a bottom end of opening and along a direction of the longitudinal axis of the opening in the die, a bottom punch having a helical groove having a shape that matches a shape of the helical protrusion.

BRIEF DESCRIPTION OF THE DRAWINGS

The features and advantages of the present invention are well understood by reading the following detailed description in conjunction with the drawings in which like numerals indicate similar elements and in which:

FIGS. 1A-1N show steps in a method of making a cutting tool green body with a press according to an aspect of the present invention showing a die of the press in cross-section;

DETAILED DESCRIPTION

Figures 1A, 1B:
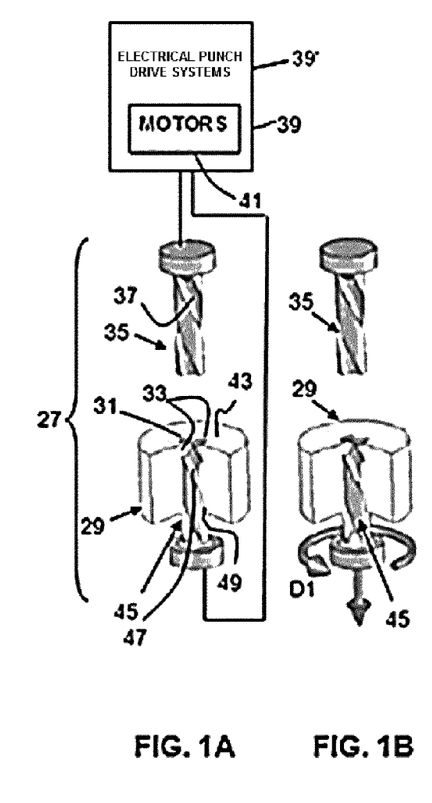
Figure 1C:
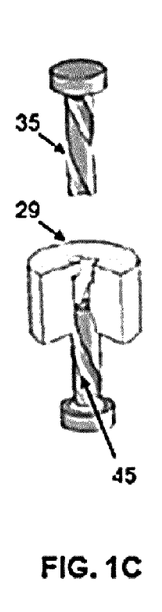
Figure 1D:
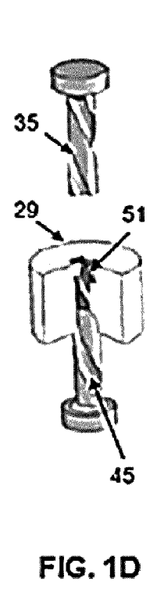
Figure 1E:
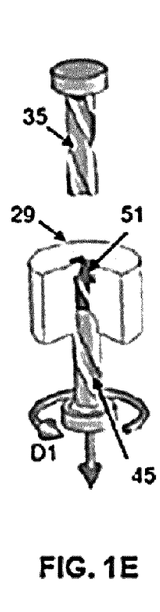
Figure 1F:
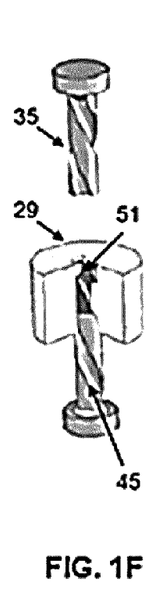
Figure 1G:
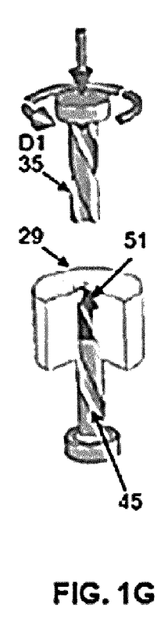
Figure 1H:
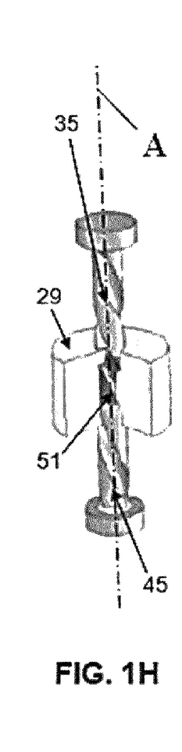
Figure 1I:
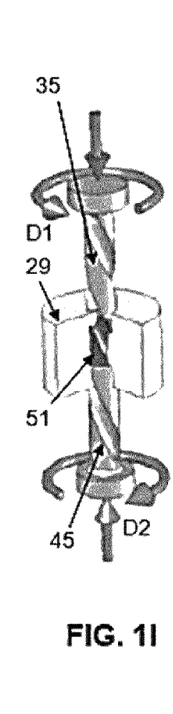
Figure 1J:
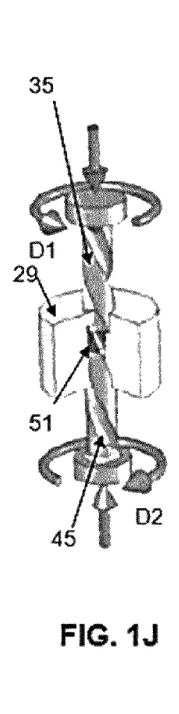
Figure 1K:
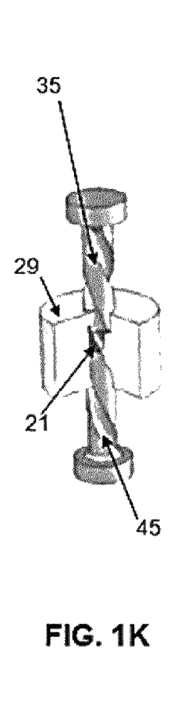
Figure 1L:
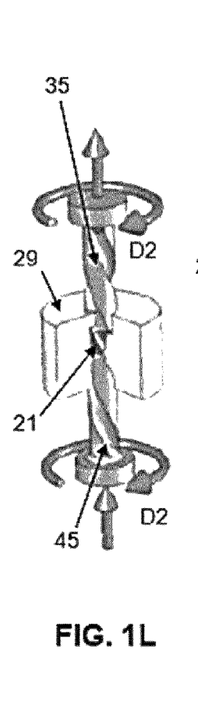
Figure 1M:
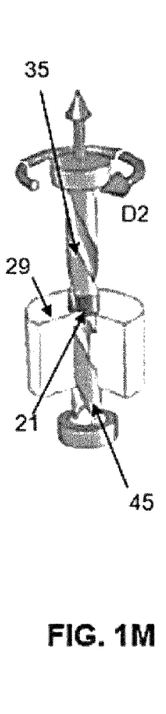
Figure 1N:
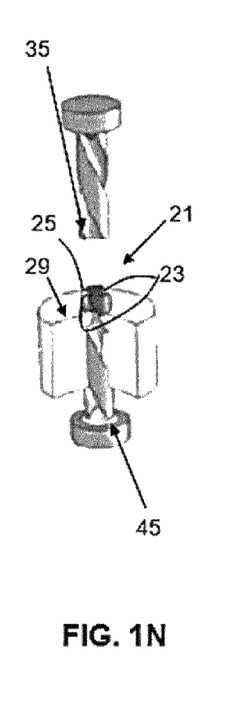
Figure 4:
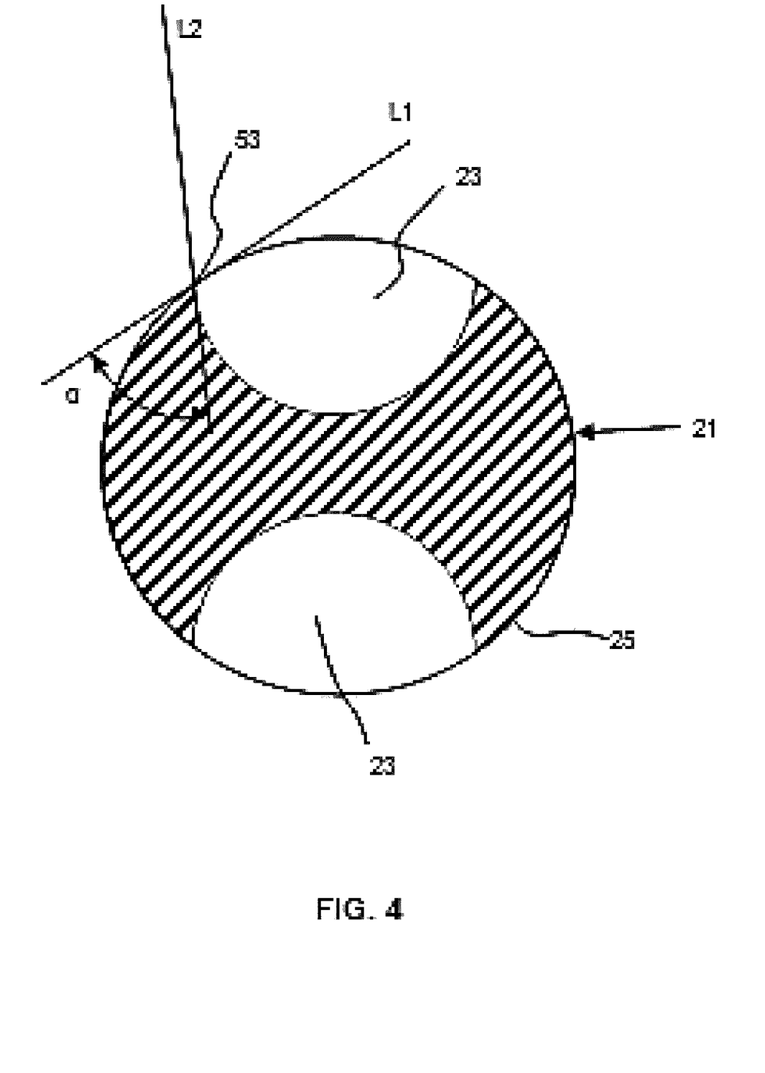
FIG. 4 shows a cross-section of a portion of a cutting tool green body.

FIGS. 1A-1N show steps in a method of making a cutting tool green body 21 (FIG. 1N) having at least one helical flute 23 in a generally cylindrical outer surface 25 (also seen in FIG. 4). The cutting tool green body 21 may be any suitable cutting tool green body in which at least one helical flute may be desired, such as a drill or boring tool green body. The cutting tool green body is typically made of a metal carbide powder, such as a tungsten carbide powder or a cermet, which has been pressed together with a binder material, such as cobalt, nickel, etc. It is understood that production of green bodies is shown in the figures. With the term "green body" is here meant a pressed but not sintered body. The term "green" does not relate to the color of the body. The subsequent sintering provides a densification of the green body, usually into a cutting tool tip, whereby the final material properties are obtained for the used powder. Final form and properties are usually obtained in secondary processes, such as by edge treatment, grinding and coating.

Figure 1P:
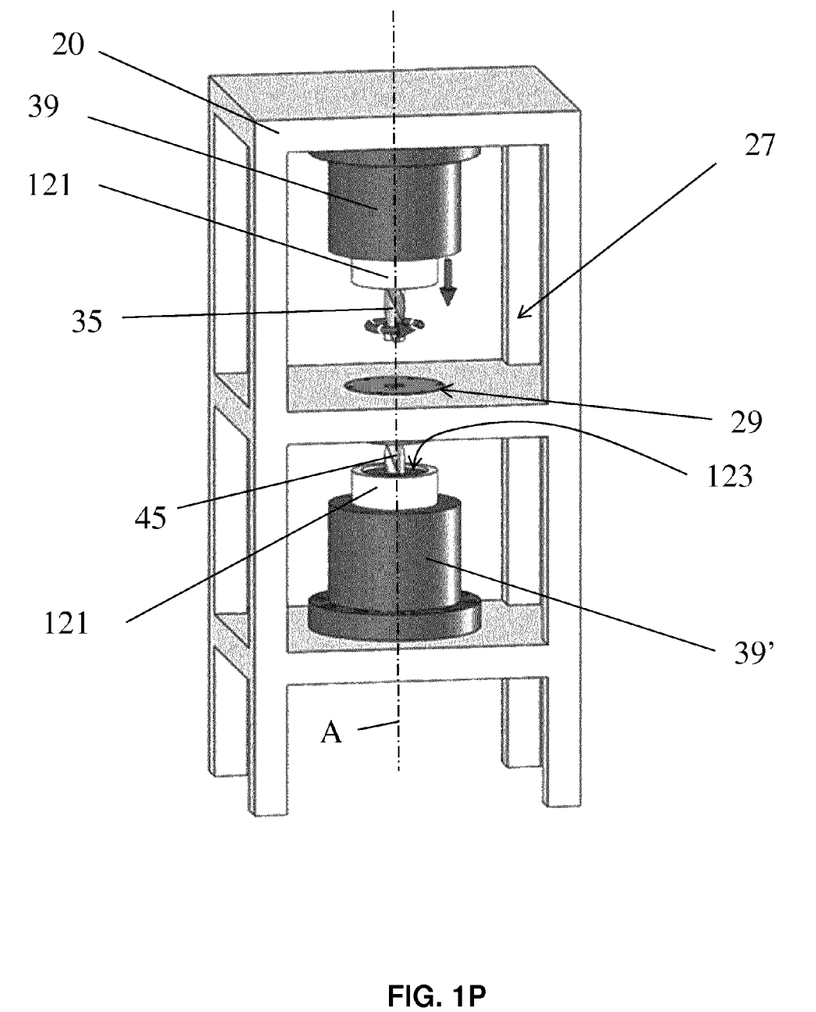
FIG. 1P shows a schematic illustration of a press.

The cutting tool green body 21 is made in a press 27 for making such a body. FIG. 1P shows a schematic illustration of a press, including a frame 20, first and second electrical punch drive systems 39 and 39', and press tools. The press 27, including frame 20, comprises a die 29 (shown in FIG. 1P and in cross-section in FIGS. 1A-1N) having a, preferably through-going, opening 31 therein with a helical protrusion 33 and, more typically, a plurality of helical protrusions, such as the two helical protrusions illustrated in FIGS. 1A-1N for forming two helical flutes 23. The press tools comprise a top punch, a die and a bottom punch. The press 27 comprises a punch 35 having a helical groove 37 having a shape that matches a shape of the helical protrusion 33.

An electrical punch drive system 39 or 39' (FIGS. 1A and 1P) is arranged to simultaneously rotate, relative to a longitudinal axis A (FIG. 1H) of the opening 31 in the die 29, and axially advance, into and along a direction of the longitudinal axis of the opening in the die, the punch. The electrical punch drive system 39, 39' comprises at least one electrical motor 41 of the type that can be used to control positioning and movement of components in a multi-axial press as such electrical drives can provide excellent positioning accuracy at minimal size.

The punch 35 can be a top punch as seen in FIGS. 1A-1N and 1P, and a first electrical punch drive system 39 can move the top punch into a top end 43 of the opening 31 of the die 29. The press 27 can also comprise a bottom punch 45 having a helical groove 47 matching the helical protrusion 33. A second electrical punch drive system 39' can be arranged to simultaneously rotate, relative to the longitudinal axis A of the opening 31 in the die 29, and axially advance, into a bottom end 49 and along a direction of the longitudinal axis of the opening in the die, the bottom punch 45. The first electrical punch drive system 39 for the top punch 35 can be identical or similar to the second electrical punch drive system 39' for the bottom punch 45.

As seen in FIGS. 1A-1N and 1P, the top punch 35 and the bottom punch 45, or parts thereof, are movable along the longitudinal axis A of the opening 31 of the die 29, and are rotatable about the longitudinal axis A. In FIGS. 1B, 1E, 1G, 1I, 1J, 1L, 1M and 1P, the rotational and linear motion are depicted by arrows. In FIGS. 1G, 1M and 1P, the arrows for the rotational motion are dashed to illustrate that the top punch does not have to rotate when it is not inside the die 29 and/or when it is not in contact with or close to the cutting tool green body 21 anymore after ejection.

In the method of making a cutting tool green body 21 according to an aspect of the present invention, in addition to supplying the opening 31 in the die 29 with a metal carbide powder 51, at least one and, ordinarily, both of the top and bottom punches 35 and 45 simultaneously rotate, relative to the longitudinal axis A of the opening in the die, and axially advance, into and along the direction of the longitudinal axis of the opening in the die, to compress the powder. With the expression "simultaneously rotate" shall in the entire description and claims be understood as rotation being executed at least when the punch has entered the opening in the die and/or when it is still in contact with or close to the cutting tool green body 21 during ejection of the cutting tool green body from the die (FIG. 1M).

FIG. 1A shows the punches 35 and 45 in what may be an initial position, although it will be appreciated that, at the outset of performing a method according to an aspect of the present invention, the punches can be in any number of positions. FIG. 1A shows a typical positioning of the punches 35 and 45 following a preceding pressing operation for making a cutting tool green body 21 after the first electrical punch drive system 39 has moved the punches to an ejection position (also shown in FIG. 1N) for picking the cutting tool green body away from the press 27.

From the position shown in FIG. 1A, the punches can be moved to the position shown in FIG. 1B, wherein the bottom punch 45 is rotated in a rotation direction D1 and axially moved downward to a fill position shown in FIG. 1C. FIG. 1D shows the die 29 filled with the metal carbide powder 51 from which the cutting tool green body 21 will be formed. The die 29 can be filled with the metal carbide powder 51 in any suitable manner, such as by means of a standard fill shoe (not shown).

From the position shown in FIG. 1D, the bottom punch 45 is rotated and moved axially downward still further as seen in FIG. 1E to a so-called "under-fill" position shown in FIG. 1F. At this point, as seen in FIG. 1G, the top punch 35 is moved axially downward toward the opening 31 of the die and, if necessary, is rotated so that the helical groove 37 of the top punch is aligned with the helical protrusion 33 of the opening of the die when it reaches the start position of the press path shown in FIG. 1H.

As seen in FIGS. 1I and 1J, from the position shown in FIG. 1H, the top punch 35 is moved axially downwardly and rotated in a first direction D1 and the bottom punch 45 can be and ordinarily is moved axially upwardly and rotated in a second direction D2, opposite from the first rotational direction, until the top and bottom punches arrive at the press position shown in FIGS. 1J and 1K.

From the press position shown in FIG. 1K, and possibly after a short unloading movement (i.e. a short movement in opposite direction when compared to FIG. 1J; not shown), the top and bottom punches 35 and 45 are, ordinarily simultaneously, moved axially upwardly and rotated in the second direction D2 shown in FIG. 1L, thereby moving the cutting tool green body 21 to the ejection position shown in FIG. 1M. When the top and bottom punches 35 and 45 have positioned the cutting tool green body 21 in the ejection position as shown in FIG. 1M, the top punch 35 continues to move axially upwardly, and may continue to rotate, until the top punch is spaced from the cutting tool green body and the tool green body can be removed, preferably by being picked by a robot from the ejection position as seen in FIG. 1N.

The method of making a cutting tool green body may comprise the step of compressing the powder with at least one of the top punch 35 and the bottom punch 45 having a shape, where the punch is in contact with the powder, and forming non-planar features in the cutting tool green body. The term "non-planar" here means all shapes different from a flat area perpendicular to the axis A.

Figure 2:
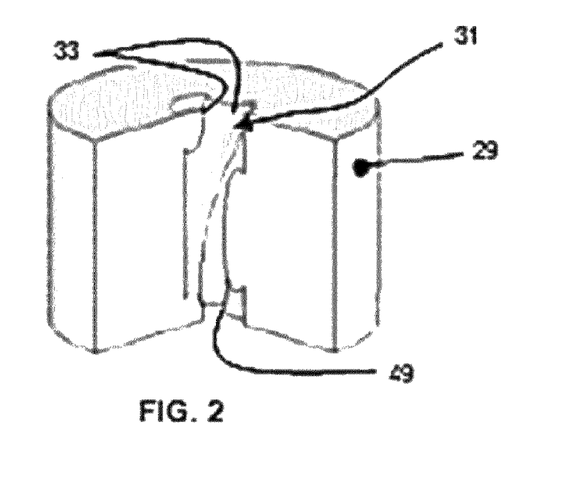
FIG. 2 shows a portion of an electrical punch drive system according to an aspect of the present invention.
Figure 3:
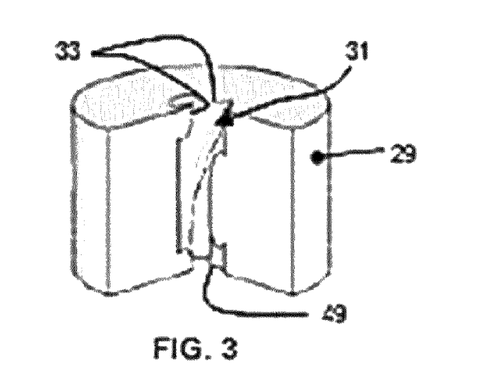
FIG. 3 shows a portion of an electrical punch drive system according to another aspect of the present invention.

The electrical punch drive system can simultaneously axially advance or withdraw and rotate the punches 35 and/or 45 in any number of ways. For example, the punches 35 and/or 45 can be axially moved and rotated entirely under the control of the electrical punch drive system that controls both the rate of axial movement and the rate of rotation. FIGS. 2 and 3 shows portions of alternative electrical punch drive systems that can simultaneously axially move and rotate a punch by transforming axial motion of part of the electrical punch drive system into rotational motion. Among the electrical punch drive system portions shown in FIGS. 2 and 3, top punches are shown, however, the same structure can be provided for bottom punches. The arrows for the rotational motion are dashed to illustrate that the top punch does not have to rotate when it is not in contact with the die and/or the cutting tool green body.

FIG. 2 shows an embodiment of a portion 141 of an electrical punch drive system for a punch 135 that comprises an outer punch drive 121 (motor, lead screw, etc. are not shown) including an auxiliary die 123 having an opening 125 with a protrusion 127, ordinarily a helical protrusion that matches the helical groove 137 of the punch. The electrical punch drive system 141 further comprises an inner punch drive 129 (motor, lead screw, etc. are not shown) that is axially movable relative to the outer punch drive 121, and a bearing 131 that rotatably mounts the punch 135 to the inner punch drive. The electrical punch drive system of FIG. 2 is also shown in FIG. 1P.

The punch 135 can be fixed to the bearing 131 in any suitable means, such as by a threaded end of the punch being received in a threaded opening in the bearing, by nuts securing a threaded punch to the bearing, or by a press fit. The bearing 131 can be a bearing of any suitable type, such as a ring bearing, that will permit the punch 135 to rotate relative to the inner punch drive 129. The bearing 131 is axially immovable relative to the inner punch drive 129, such as by being disposed between flanges or rings in an interior opening of the inner punch drive. The punch 135 is screwed into the opening 125 of the auxiliary die 123.

When the outer punch drive 121 and the inner punch drive 129 move axially relative to each other, such as by moving the inner punch drive while holding the outer punch drive stationary, the punch 135 will rotate as it is pushed down or pulled up relative to the auxiliary die 123 and the helical groove 137 on the punch is moved along the protrusion 127 on the auxiliary die.

Alternatively, the punches 35 and/or 45 can be axially moved by an electrical drive, for example the outer punch drive and rotated by means of a rotational motor. The rotational motor would be secured to an end of a linearly driven journal (similar to the outer punch drive 121) via its motor housing and the punch is immovably fixed to a rotor in the housing. The rotational motor would control the rate of rotation of the punch.

FIG. 3 shows an embodiment of a portion of another electrical punch drive system 241 for a punch 235 that comprises an inner punch drive (229) and an outer punch drive (221) that is axially movable relative to the inner punch drive. The inner punch drive 229 includes an auxiliary punch 233 having a helical groove 237. A bearing assembly comprises a bearing 231 and an auxiliary die 223 that has a protrusion 227, which may be a helical protrusion that is received in the helical groove 237 of the auxiliary punch 233. The auxiliary die 223 is rotatably mounted via a bearing 231 in the outer punch drive 221.

The punch 235 is attached to and rotates with the auxiliary die 223 by any suitable means. The bearing 231 can be a bearing of any suitable type, such as a ring bearing, that will permit the auxiliary die 223 and the punch 235 attached thereto to rotate relative to the inner punch drive 229 and/or outer punch drive 221. The bearing 231 and the auxiliary die 223 are axially immovable relative to the outer punch drive 221, such as by being disposed between flanges or rings in an interior opening of the outer punch drive.

The helical groove 237 of the auxiliary punch 233 can have a different pitch than the helical groove 237 of the punch 235, to provide more rotation to the auxiliary die 223.

As seen, for example, in FIGS. 2 and 3, the die 31 can have a plurality of helical protrusions 33, such as two helical protrusions for forming two helical flutes in a cutting tool green body. As seen, for example, in FIG. 4, the cutting tool green body 21 typically has a generally circularly cylindrical outer surface 25 and one or more helical flutes 23 formed in the outer surface. A circumference of the cutting tool green body 21 is comprised of the outer surface and the one or more helical flutes, and the one or more helical flutes defining no more than fifty percent of the circumference.

As seen in FIG. 4, an angle $\alpha$ at an intersection 53 between a line L1 tangent to the outer surface 25 and a line L2 tangent to the one or more helical flutes 23 at the intersection is acute, such as between 7 and less than 90 degrees, preferably about 8 to 15 degrees.

Any one of the punches such as the top punch 35, 135, 235 and/or the bottom punch 45 may be provided with a shape where the punch is to be in contact with the powder for forming non-planar features in the green body. That is, the punch may comprise non-planar features at a free end thereof in order to directly or indirectly create prerequisites for a cutting edge, a clearance surface, a non-planar support surface, and cores for flush channels, with the intention to give a near net shape or final shape to the cutting tool green body 21. The shape for forming green edges may extend radially at the free end relative to the longitudinal axis of the opening in the die along a cone or similar. The cutting tool green body 21 is then sintered and possibly machining can be performed, such as grinding of the clearance surfaces.

Alternatively, for all embodiments the bottom punch may be fixed while the die is rotatable and being axially moved.

The claimed press and method offer advantages including facilitating manufacture of tool green bodies with helical flutes using equipment that is highly accurate and can be of minimal size.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

The disclosures in EP Patent Application No. 13186650.1, from which this application claims priority, are incorporated herein by reference.

The invention claimed is:

1. A press for making a cutting tool green body having at least one helical flute, the press comprising:
   a die having an opening with at least one helical protrusion;
   a top punch having at least one helical groove having a shape that matches a shape of the helical protrusion;
   a bottom punch having at least one helical groove having a shape that matches the shape the helical protrusion;
   a first electrical punch drive system arranged to simultaneously rotate the top punch relative to a longitudinal axis of the opening in the die, and axially advance the top punch into a top end and along a direction of the longitudinal axis of the opening in the die; and
   a second electrical punch drive system arranged to simultaneously rotate the bottom punch relative to the longitudinal axis of the opening in the die, and axially advance the bottom punch into a bottom end and along the direction of the longitudinal axis of the opening in the die.

2. The press of claim 1, wherein the first electrical punch drive system is arranged to move the top punch to an ejection position.

3. The press of claim 1, wherein the first or second electrical punch drive system includes, for at least one punch of the top punch and the bottom punch respectively, an inner punch drive and an outer punch drive that is axially movable relative to the inner punch drive, the inner punch drive including an auxiliary punch having at least one helical groove, an auxiliary die having at least one protrusion that is received in the helical groove of the auxiliary punch and is rotatably mounted via a bearing in the outer punch drive, the at least one punch being attached to and rotating with the auxiliary die.

4. The press of claim 3, wherein the helical groove of the auxiliary punch has a different pitch than the helical groove of the at least one punch.

5. The press of claim 3, wherein the bearing is axially immovable relative to the outer punch drive.

6. The press of claim 3, wherein the protrusion in the auxiliary die is a helical protrusion.

7. The press of claim 1, wherein the die has a plurality of helical protrusions.

8. The press of claim 1, wherein the die has two helical protrusions.

9. The press of claim 1, wherein at least one of the top punch and the bottom punch is provided with a shape, the punch being arranged to be in contact with the powder, for forming non-planar features in the cutting tool green body.

10. A press for making a cutting tool green body having at least one helical flute, the press comprising:
   a die having an opening with at least one helical protrusion;
   a top punch having at least one helical groove having a shape that matches a shape of the helical protrusion;
   a bottom punch having at least one helical groove having a shape that matches the shape the helical protrusion;
   a first electrical punch drive system arranged to simultaneously rotate the top punch relative to a longitudinal axis of the opening in the die, and axially advance the top punch into a top end and along a direction of the longitudinal axis of the opening in the die; and
   a second electrical punch drive system arranged to simultaneously rotate the bottom punch relative to the longitudinal axis of the opening in the die, and axially advance the bottom punch into a bottom end and along the direction of the longitudinal axis of the opening in the die, wherein the first or second electrical punch drive system includes, for at least one punch of the top punch and the bottom punch respectively, an outer punch drive, and including an auxiliary die having an opening with a protrusion received in the helical groove of the punch, and an inner punch drive axially movable relative to the outer punch drive, and a bearing that rotatably mounts the punch to the inner punch drive, the at least one punch being screwed into the opening of the auxiliary die.

11. The press of claim 10, wherein the bearing is axially immovable relative to the inner punch drive.

12. A method of making a cutting tool green body having at least one helical flute, comprising:
   supplying an opening in a die having at least one helical protrusion arranged to form the helical flute with a metal carbide powder; and
   compressing the powder by
   operating a first electrical punch drive system to simultaneously rotate, relative to a longitudinal axis of the opening in the die, and axially advance, into a top end of opening and along a direction of the longitudinal axis of the opening in the die, a top punch having at least one helical groove having a shape that matches a shape of the helical protrusion, and
   operating a second electrical punch drive system to simultaneously rotate, relative to a longitudinal axis of the opening in the die, and axially advance, into a bottom end of opening and along a direction of the longitudinal axis of the opening in the die, a bottom punch having at least one helical groove having a shape that matches a shape of the helical protrusion.

13. The method of claim 12, wherein the step of compressing the powder includes at least one of the top punch and the bottom punch having a shape, where the punch is in contact with the powder, and forming non-planar features in the cutting tool green body.

* * * * *